(12) United States Patent
Hanss et al.

(10) Patent No.: US 10,401,250 B2
(45) Date of Patent: Sep. 3, 2019

(54) LEAKAGE DETECTION AND LEAKAGE LOCATION IN SUPPLY NETWORKS

(75) Inventors: Holger Hanss, Germersheim (DE); Kurt Majewski, München (DE); Jörg Nieveler, München (DE); Jan Christoph Wehrstedt, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1102 days.

(21) Appl. No.: 13/883,736

(22) PCT Filed: Oct. 27, 2011

(86) PCT No.: PCT/EP2011/068817
§ 371 (c)(1),
(2), (4) Date: May 6, 2013

(87) PCT Pub. No.: WO2012/059390
PCT Pub. Date: May 10, 2012

(65) Prior Publication Data
US 2013/0231876 A1    Sep. 5, 2013

(30) Foreign Application Priority Data
Nov. 5, 2010 (DE) .......... 10 2010 043 482

(51) Int. Cl.
*F17D 5/02* (2006.01)
*G01M 3/00* (2006.01)
(Continued)

(52) U.S. Cl.
CPC ............... *G01M 3/00* (2013.01); *F17D 5/02* (2013.01); *G01M 3/26* (2013.01); *G01M 3/2807* (2013.01); *G06F 17/10* (2013.01)

(58) Field of Classification Search
CPC ..... G01F 1/50; F17D 5/02; F17D 5/06; A01G 25/167; G06F 17/30241; G06F 17/10;
(Continued)

(56) References Cited

U.S. PATENT DOCUMENTS

| | | | |
|---|---|---|---|
| 5,866,803 A | 2/1999 | Namba et al. | 73/40.5 R |
| 6,957,157 B2 * | 10/2005 | Lander | G01M 3/243 340/605 |

(Continued)

FOREIGN PATENT DOCUMENTS

| | | | |
|---|---|---|---|
| CN | 1176694 A | 3/1998 | G01F 1/00 |
| CN | 1375055 A | 10/2002 | G01M 3/00 |

(Continued)

OTHER PUBLICATIONS

Chinese Office Action, Application No. 201180053302, 11 pages, dated Sep. 18, 2014.

(Continued)

*Primary Examiner* — Regis J Betsch
*Assistant Examiner* — Kaleria Knox
(74) *Attorney, Agent, or Firm* — Slayden Grubert Beard PLLC

(57) ABSTRACT

A method and device are provided for leakage detection and leakage location in an area of a supply network (e.g. water supply, gas supply or district heating network), wherein measurement values of sensors of the supply network are statistically analyzed for the presence of leakages using robust regression methods. The false alarm rate (type 2 error) may be reduced or minimized.

17 Claims, 2 Drawing Sheets

(51) Int. Cl.
*G01M 3/26* (2006.01)
*G01M 3/28* (2006.01)
*G06F 17/10* (2006.01)

(58) Field of Classification Search
CPC ...... G01M 3/243; G01M 3/2807; G01M 3/00; G01M 3/26; F16D 5/02; G01D 4/002; E03B 7/02
USPC ........ 702/100, 185, 2; 701/532; 137/624.12, 137/460; 340/605
See application file for complete search history.

(56) References Cited

U.S. PATENT DOCUMENTS

| | | | | |
|---|---|---|---|---|
| 6,970,808 | B2 * | 11/2005 | Abhulimen | F17D 5/02 702/185 |
| 7,201,071 | B2 | 4/2007 | Wei et al. | 73/863.03 |
| 7,306,008 | B2 * | 12/2007 | Tornay | F17D 5/06 137/460 |
| 7,359,931 | B2 * | 4/2008 | Tarabzouni | G06F 17/30241 702/2 |
| 7,920,983 | B1 * | 4/2011 | Peleg | G01M 3/2807 137/1 |
| 7,930,069 | B2 * | 4/2011 | Savelle, Jr. | A01G 25/167 137/624.12 |
| 2003/0204338 | A1 | 10/2003 | Martinek | 702/51 |
| 2005/0228580 | A1 * | 10/2005 | Winner | G01S 13/931 701/532 |
| 2007/0131807 | A1 | 6/2007 | Umeda et al. | 241/34 |
| 2009/0299660 | A1 * | 12/2009 | Winter | G01D 4/002 702/51 |
| 2010/0000298 | A1 | 1/2010 | Swaffield et al. | 73/40.5 A |
| 2011/0290331 | A1 * | 12/2011 | Burrows | E03B 7/02 137/14 |
| 2013/0231876 | A1 | 9/2013 | Hanss et al. | 702/51 |

FOREIGN PATENT DOCUMENTS

| | | | | |
|---|---|---|---|---|
| DE | 102008048747 B3 | | 1/2010 | ............ F17D 5/02 |
| DE | 102008048748 | * | 1/2010 | ............ F17D 5/02 |
| DE | 102008048748 B3 | | 1/2010 | ............ F17D 5/02 |
| EP | 1864104 A2 | | 12/2007 | ............ G01N 1/22 |
| JP | 4093743 A | | 3/1992 | ............ G01M 3/28 |
| JP | 2003123785 A | | 4/2003 | ............ H01M 8/02 |
| WO | 2012/059390 A1 | | 5/2012 | ............ F17D 5/02 |

OTHER PUBLICATIONS

International Search Report and Written Opinion, Application No. PCT/EP2011/068817, 19 pages, dated Feb. 13, 2012.

* cited by examiner

B1

DMA inflow

B2

◯ Through-flow meter

LEAKAGE DETECTION AND LEAKAGE LOCATION IN SUPPLY NETWORKS

CROSS-REFERENCE TO RELATED APPLICATIONS

This application is a U.S. National Stage Application of International Application No. PCT/EP2011/068817 filed Oct. 27, 2011, which designates the United States of America, and claims priority to DE Patent Application No. 10 2010 043 482.5 filed Nov. 5, 2010 The contents of which are hereby incorporated by reference in their entirety.

TECHNICAL FIELD

The present disclosure relates to a method, a use, and a device for leakage detection and leakage location in an area of a supply network.

BACKGROUND

Drinking water has become one of the most important commodities in the twenty-first century. Yet sometimes significant water losses occur in water distribution networks.

The conservation of this commodity represents a considerable challenge in terms of leakage detection and leakage location in water networks. The use of mass balancing to detect water losses, wherein all of the supply volumes and particularly the water withdrawal volumes of all individual water consumers are measured, exceeds the limits of feasibility in terms of expense. Moreover, legislation requires time-based consumption measurements and consumption records for all customer data.

In order to detect leakages in water networks, conventional methods simply measure the entire water volume which flows into the network at a specific time, e.g. the time period between 02:00 and 04:00 at night. These values generate a time series that is analyzed for the presence of a sudden rise in the consumption and hence a possible leakage. Conventional methods do not allow the withdrawals from the system to be balanced. Rule-of-thumb formulas are available for determining typical water consumption of specific consumers. However, these are very general and do not allow exceptional effects, particularly those of limited duration, to be taken into consideration with sufficient accuracy.

Most water supply networks are very large and are usually divided into water supply zones. These zones are again divided into subzones, which are known as district meter areas (DMA) due to the influence of British engineers. The DMAs are so designed as to have only one inflow, whose through-flow is measured. Irregularities in water consumption and hence leakages are deduced from the observation of this through-flow measurement. According to conventional methods, provision is specifically made for performing a so-called 'Night Flow Analysis'. In this context, a detailed record of the nightly inflow values into a DMA (e.g. every 5 seconds between 02:00-04:00 hours) is used to determine a minimal inflow value, also referred to here as background consumption, comprising the normal nightly (minimal) consumption and any existing leakages (including small leakages in particular).

A time series over days and weeks is then produced based on these minimal inflow values into a DMA during low-consumption nighttimes, e.g. between 02:00 and 04:00 hours, wherein only one value per night is provided. Any rise (particularly a sudden rise) in these minimal consumption values, said rise being detected e.g. when a threshold is exceeded, may be caused by a new leakage.

For the purpose of localization or leakage location, a step test is usually performed. For this, small regions are successively disconnected from the DMA at times of low consumption, and the change in consumption is observed. Regions resulting in a significant and inexplicable decrease in the consumption are then examined further for leakages.

Alternatively, the water system can be monitored locally for leakages by means of noise meters, and the leakage point can be calculated by observing the noise correlation.

Neither of the conventional methods cited above are suitable for continuous monitoring. Step tests are associated with considerable expense because the affected households must be notified before the disconnection and a replacement supply must be provided. Noise measurement involves considerable expense because the measurements can only be performed by specialists on site. In addition, these examinations are only possible locally. Furthermore, both conventional methods can only be used at times of low consumption, in order to avoid excessive measurement interference due to consumption fluctuations. Current methods for leakage detection therefore suffer from a fundamental problem that false alarms are reported very frequently and that a leakage is therefore erroneously assumed to be present (type 2 error). The expenses associated with localization of the leakage (sending out a search unit, acoustic localization, step test, through to excavation and drilling) are incurred in vain in such cases. This is costly and represents a nuisance to those involved.

SUMMARY

One embodiment provides method for leakage detection and leakage location in an area of a supply network, comprising the steps: (a) dividing the supply network into areas which essentially have a comparable consumption profile, wherein the entire water consumption can be measured for each area; (b) determining a regression curve of the inflow for areas that are comparable in each case, based on past values in respect of which it is assumed that the supply network was free of leaks, by means of robust regression methods, and determining a region of confidence around the regression curve (RK), wherein measurement values within the region of confidence indicate zero leakage; (c) measuring a respective minimal inflow for each area within a defined measurement period; (d) generating time series of measurement values of the minimal inflow for selected areas over a number of measurement periods; (e) comparing the time series of the measurement values of the minimal inflow with the regression curve, wherein measurement values lying outside the region of confidence indicate the presence of a leakage in the supply network.

In a further embodiment, the time series of the measurement values are entered into a system of coordinates, wherein each coordinate axis represents an area, wherein the position of a measurement value relative to a coordinate axis indicates a leakage within the corresponding area.

In a further embodiment, the quality of the regression curve is defined by a robust correlation coefficient.

In a further embodiment, the areas can also be virtual district meter areas.

In a further embodiment, sliding mean values or the integrated flow are used instead of the measurement values of the minimal inflow of the areas.

In a further embodiment, the measurement period is from 02:00 to 04:00 hours, from 00:00 to 24:00 hours and/or from 06:00 to 18:00 hours, for example.

In a further embodiment, an alarm is triggered if a measurement value lies outside the region of confidence.

In a further embodiment, the disclosed method is used for an infrastructure network for the transportation of a fluid.

In a further embodiment, the infrastructure network is a water supply network or a gas supply network or a district heating network.

Another embodiment provides a device for using a method as disclosed above, said device comprising: (a) sensors for measuring a respective minimal inflow for each area within a defined measurement period; (b) means for generating time series of measurement values of the minimal inflow for selected areas over a number of measurement periods; and (c) means for comparing the time series of the measurement values of the minimal inflow with a reference regression curve, wherein measurement values lying outside the region of confidence indicate the presence of a leakage in the supply network.

BRIEF DESCRIPTION OF THE DRAWINGS

Example embodiments is explained below and illustrated in the drawing, in which.

DETAILED DESCRIPTION

Figure 1:
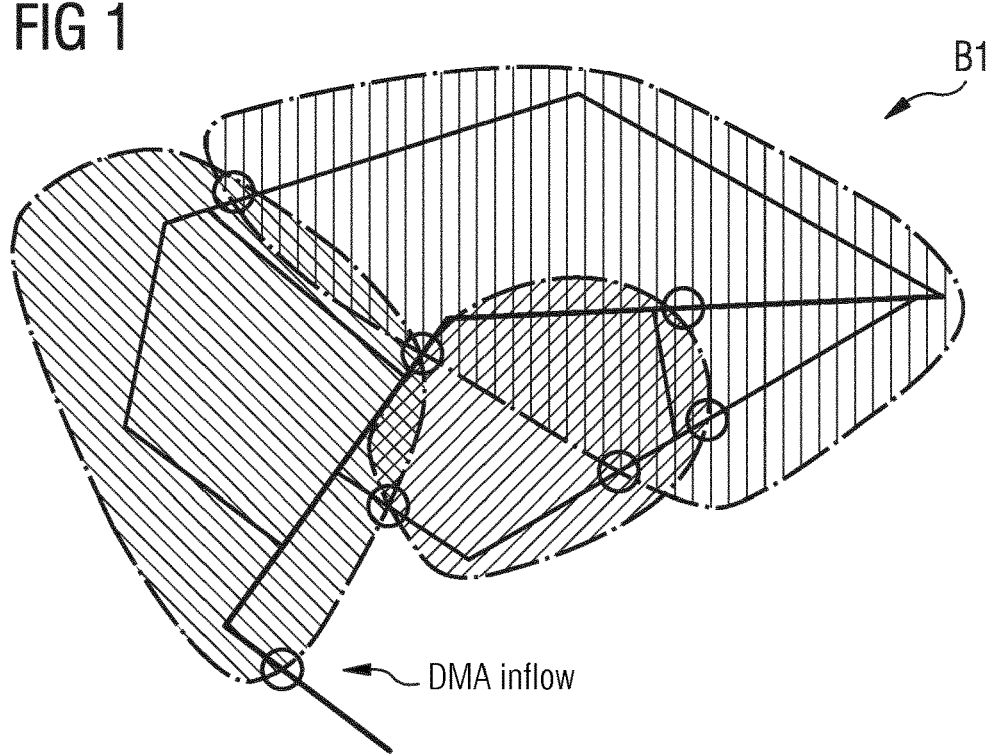
FIG. 1 shows exemplary embodiments of areas, e.g., of a supply network or a virtual zone.
Figure 1:
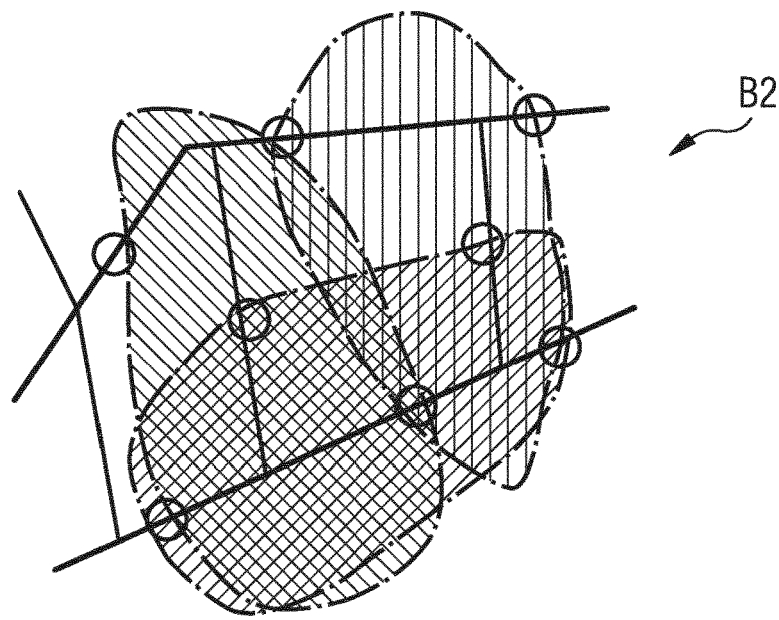

Some embodiments provide a method, a use and a device for detecting leakages in a supply network such that in particular the probability of false alarms (type 2 error) is reduced.

Some embodiments provide a method for leakage detection and leakage location in an area of a supply network, said method comprising steps as follows:
a) dividing the supply network into areas (DMA) which essentially have a comparable consumption profile, wherein the entire water consumption can be measured for each area (DMA);
b) determining a regression curve of the inflow for areas (DMA) that are comparable in each case, based on past values in respect of which it is assumed that the supply network was free of leaks, by means of robust regression methods, and determining a region of confidence around the regression curve, wherein measurement values within the region of confidence indicate zero leakage;
c) measuring a respective minimal inflow for each area (DMA) within a defined measurement period;
d) generating time series of measurement values of the minimal inflow for selected areas (DMA) over a number of measurement periods;
e) comparing the time series of the measurement values of the minimal inflow with the regression curve, wherein measurement values lying outside the region of confidence indicate the presence of a leakage in the supply network. The method is easy to automate and easy to operate in conjunction with other methods which observe each area separately (e.g. camera monitoring, pressure sensor technology). Dynamic non-periodic exceptional effects (e.g. higher water consumption during sporting events on television) can also be taken into consideration, thereby further reducing the false alarm rate.

According to one embodiment, the time series of the measurement values are entered into a system of coordinates, wherein each coordinate axis represents an area (DMA), wherein the position of a measurement value relative to a coordinate axis indicates a leakage within the corresponding area (DMA). This allows possible leakages in a supply network to be detected very easily, automatically and/or visually (e.g. on a monitoring screen in a control station).

According to a further embodiment, the quality of the regression curve is defined by a robust correlation coefficient. This ensures that the position of the regression curve is only slightly affected by outliers in the measurement series.

According to a further embodiment, the areas (DMA) can also be virtual district meter areas (virtual zones). Virtual zones or so-called virtual district meter areas (DMA) are subareas of a network whose inflows and outflows are measured by means of through-flow meters, wherein said areas need not be disjunct. Provision is made for successively evaluating the time series for all areas and detecting leakages in said areas. Finally, the location of the leakage is delimited based on the leakage information for the individual areas. Leakage information is information that indicates whether or not a leakage has been detected in the area. Virtual district meter areas (virtual DMAs) differ from conventional areas (DMAs) as follows. When dividing zones into DMAs, it was always conventionally endeavored so to configure these that only one inflow or one inflow pipe was present, it being possible to monitor this using a single sensor. Additional through-flow sensors are installed at selected points in the supply zones, thereby creating network subsections whose inflows and outflows can be measured. These subsections should have a shared element. The subsections should overlap and feature shared through-flow meters. Such subsections are referred to as virtual zones or virtual DMAs.

According to a further embodiment, sliding mean values or the integrated flow are used instead of the measurement values of the minimal inflow of the areas. In this way, the technical embodiment allows for the presence of measurement errors in the individual measurement variables. Sliding mean values have a smoothing capacity. The mean values can balance out fluctuating nighttime toilet visits, for example.

According to a further embodiment, the measurement period is from 02:00 to 04:00 hours, from 00:00 to 24:00 hours and/or from 06:00 to 18:00 hours, for example. In the case of a Night Flow Analysis, the through-flow is measured by all of the through-flow meters or sensors at night (e.g. between 02:00 and 04:00) for the purpose of such an analysis. Instead of nighttime examination, other time periods can be observed for integrated flow examinations, e.g. 24 hours or a plurality of measurement periods during a day. The methods described above can be used in the same way here, but the number of time series and the period length must be adapted to the typical component. An extension to the measurement period between 02:00 and 04:00 hours for a minimal volume flow is not beneficial, because this time span was selected in advance such that the minimal consumption occurs during this time period.

According to a further embodiment, an alarm is triggered in the event of a measurement value outside the region of confidence. This means that an alarm can be raised in a control room of the supply network or of an area to be supplied, for example, and the corresponding countermeasures can be initiated (e.g. localization and sealing off, or rerouting the medium). Measures can also be initiated automatically based on the alarm data (location, amount of water wastage, number of consumers affected).

According to a further embodiment, a method as claimed in one of the claims 1 to 6 is used for an infrastructure network for the transportation of a fluid. The measurement values for fluids can be determined easily and accurately by means of corresponding sensor technology (e.g. pressure sensors or through-flow sensors), and can therefore used for reliable forecasts.

According to a further embodiment, the infrastructure network is a water supply network or a gas supply network or a district heating network. Embodiments can be applied to all infrastructure networks in which fluids are transported and consumed. Gas supply networks and district heating networks are examples of such infrastructure networks.

Other embodiments provide a device for using the disclosed method, said device comprising:
a) sensors for measuring a respective minimal inflow for each area (DMA) within a defined measurement period;
b) means for generating time series of measurement values of the minimal inflow for selected areas (DMA) over a number of measurement periods;
c) means for comparing the time series of the measurement values of the minimal inflow with a reference regression curve, wherein measurement values lying outside the region of confidence indicate the presence of a leak in the supply network. The device can be manufactured using industry-standard means. For example, the corresponding sensor technology is available from corresponding building supplies stores and the means for generating and comparing time series can be realized using personal computers and corresponding software (e.g. spreadsheet or mathematics programs).

The reduction of water losses represents a significant challenge in terms of leakage detection and localization in water supply networks. Water losses can be detected in subareas of a network by means of through-flow volume measurements at all inflows and outflows of the area and by performing mass balancing.

Such measurements exceed the limits of feasibility in terms of both expense and legislation (time-based consumption measurements and records for all customers can lead to data protection problems). However, new and more economical measuring devices allow the monitoring of physically relevant values such as pressure, through-flow, etc. These measurements can be performed at numerous points in the water network. The values which are periodically recorded during the predetermined time periods are combined into time series, which are examined using statistical methods for signs of existing or newly occurring leaks. If the statistical analysis indicates a leak (leakage), the exact point of loss must be determined and repaired by means of precise position fixing (e.g. by means of noise analysis, excavation) in the region that has been delimited by the sensors. Since the number of measurement points is small in comparison with the number of water pipes, it may be necessary to examine a large number of pipes. The frequency of false alarms should therefore be low. The following proposes an approach by means of which false alarms (type 2 errors) can be reduced by comparing various time series using statistical methods.

The water supply networks are generally very large and are divided into water supply zones (areas). These areas can be divided again into subzones, which are known as district meter areas (DMA) due to the influence of British engineers. The DMAs are so designed as to have only one inflow in each case, whose through-flow is measured. Alternatively, virtual zones which may have a plurality of inflows and outflows can also be used instead of physical DMAs. Irregularities in the water consumption and hence leakages are deduced from the observation of the through-flow measurement. Specifically, a so-called Night Flow Analysis is performed. A DMA is performed based on the minimal inflow values during low-consumption nighttimes, e.g. between 02:00 and 04:00 hours. Using one value per night, a time series is produced over days and weeks. The (sudden) rise in these minimal consumption values, said rise being detected e.g. when a threshold is exceeded, may be caused by a new leakage.

Particular events such as the use of lawn sprinklers, sporting events or traditional celebrations during the nighttime measurement therefore result in an increase of the minimal inflow in various DMAs. This means that an alarm is triggered for all DMAs. It was previously necessary for the user of the system to detect and eliminate such false alarms by means of further examination. The present disclosure provides an automatic method for detecting cross-network events in order to reduce false alarms during the analysis of leakages.

FIG. 1 shows two exemplary embodiments B1, B2 for example areas DMA. An area DMA can be a geophysical area of the supply network or a virtual zone. Virtual district meter areas (virtual DMAs) differ from conventional areas (DMAs) as follows. When dividing the supply network into areas (DMAs), it was always conventionally endeavored so to configure these that only one inflow or one inflow pipe was present, it being possible to monitor this using a single sensor. Additional through-flow sensors are installed at selected points in the supply zones, thereby creating network subsections whose inflows and outflows can be measured. These subsections should have a shared element. The subsections should overlap and feature shared through-flow meters. Such subsections are referred to as virtual zones or virtual DMAs.

In the procedure for creating virtual zones (virtual areas), a universal method is proposed for dividing supply networks in such a way that subareas, e.g. comprising one or more line sections, can be monitored more than once in respect of leakage detection. The monitoring of each virtual zone functions according to the same principle and can be applied more than once accordingly in a technical solution. The division of a network into virtual zones has the advantage that, with the exception of installing through-flow meters, no change to the existing network is required. It is also advantageous that the leakage detection can run automatically without disrupting the operation of the supply network or performing laborious, cost-intensive measurements locally.

Figure 2:
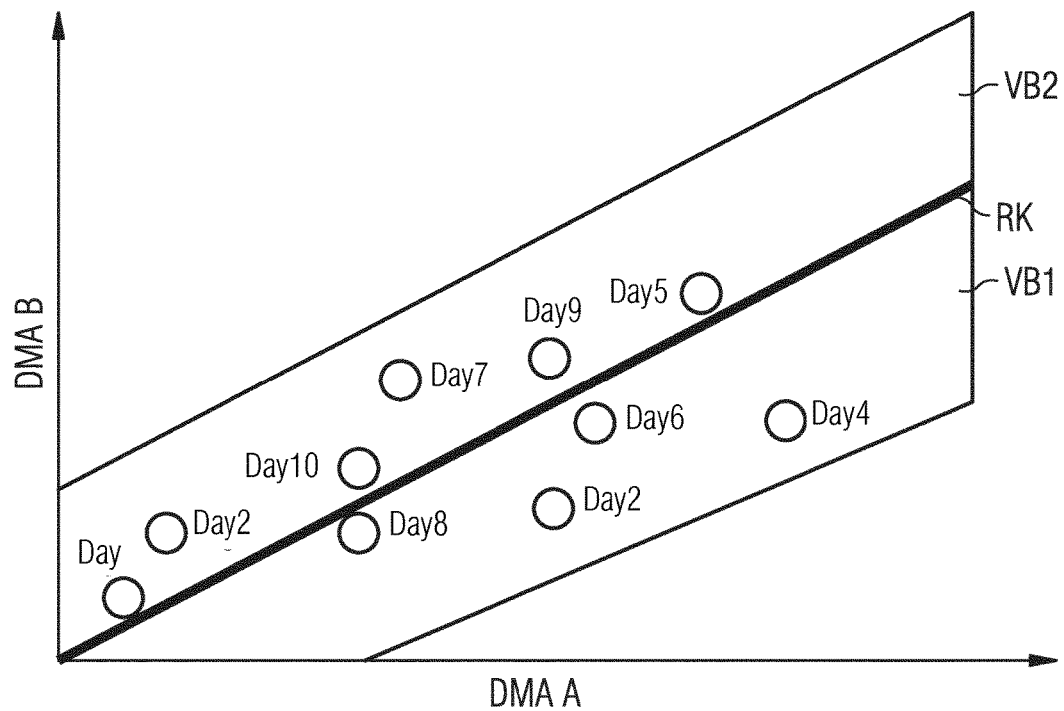
FIG. 2 shows an example of a regression curve with adjacent example regions of confidence.

FIG. 2 shows an example of a regression curve RK with adjacent exemplary regions of confidence VB1, VB2 in which measurement values are marked. Measurement values for the area A (DMA A) and the area B (DMA B) are marked in the diagram according to FIG. 2. One measurement value is entered for each day in the diagram according to FIG. 2. Furthermore, FIG. 2 relates to the specific case of a linear regression. Therefore the regression curve RK is a straight line. The regions of confidence VB1, VB2 relating to an area (VB1 relating to DMA A and VB2 relating to DMA B in FIG. 2) can each have the same distance from the regression curve RK. However, this is not necessary. The regions of confidence VB1, VB2 for specific areas can also be dimensioned differently and can be adapted to the respective requirements of an area. It is therefore possible when dimensioning a region of confidence, for example, to take into account the fact that the piping and the infrastructure are new and therefore less susceptible in the area concerned, while an infrastructure that is old and therefore susceptible to faults may be present in another area.

Time series belonging to independent areas (DMAs) are compared in each case. These areas DMA should have a comparable consumption profile. Furthermore, the associated time series are combined into one time series in such a way that a value set is produced for each day. The procedure for two time series is described in FIG. 2.

N past values, in respect of which it is assumed that the supply network was free of leaks at the time of recording, are so plotted in a system of coordinates that the values belonging to the first area DMA A are plotted on the x-axis and those belonging to the second area DMA B are plotted on the y-axis. This results in a point cloud. A compensating curve is positioned in the point cloud using robust regression methods. A robust correlation coefficient ensures the quality of the approximation. Said robust regression has the advantage that the position of the regression curve RK is only affected slightly by outliers in the data which is used for the calibration. In the specific case of a linear regression, the regression curve is a straight line or a hyperplane. The regression curve RK can be defined by the least squares method, for example. A region of confidence VB is positioned around the regression curve RK. The region of confidence can be defined empirically, for example. Measurement values outside the region of confidence VB indicate a leakage and result in an alarm.

The specification of the regression curve RK and the definition of the region of confidence VB are therefore part of an initialization. In respect of new measurement values, a decision is taken as to whether they fit into this distribution. To this end, the distance from the measurement value to the regression curve is measured. If said distance exceeds a user-selectable value VB, an alarm is triggered and a reference to a leakage is output. If the value lies below the curve, the possible leakage is in the area DMA A, otherwise it is in the area DMA B as per the example in FIG. 2. The method proposed here can be used in conjunction with other methods, which observe each zone separately, and can therefore be used to avoid false alarms in the context of leakage detection. The possible identification of exceptional events has the advantage that, with the exception of installing sensors, no changes are required to the existing water network. It is also advantageous that the leakage detection can run automatically without disrupting the operation of the water network or performing laborious and cost-intensive measurements locally. In principle, the method can be used for all infrastructure networks in which fluids or gases are transported. Examples include gas supply networks and district heating networks.

An alarm may be received in a control unit for monitoring the supply network, for example, and automatically activate further measures (e.g. close valves, reroute the fluid).

Figure 3:
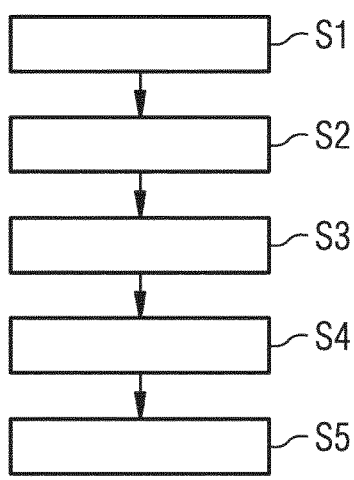
FIG. 3 shows an example flow diagram for performing the disclosed method according to one embodiment.

FIG. 3 shows an exemplary flow diagram for performing the method according to an example embodiment. In step S1, the supply network is divided into areas (DMA). The areas should essentially have a comparable comparison profile, and only one inflow in each case. In step S2, a regression curve RK of the inflow is determined for areas that are comparable in each case based on past values. It is assumed in this case that the supply network was free of leaks when the values for the curve were collected. The curve can be determined using the least squares method, for example. A region of confidence VB around the regression curve RK is determined using empirical experience values, wherein measurement values within the region of confidence VB indicate zero leakage. In step S3, a respective minimal inflow is measured for each area DMA within a defined measurement period. The measurement period can be e.g. one measurement per day in an area in each case. In step S4, time series of measurement values of the minimal inflow are generated for selected areas over a number of measurement periods. In step S5, time series of new measurement values of the minimal inflow are compared with the regression curve RK, wherein measurement values lying outside the region of confidence VB indicate the presence of a leak in the supply network.

Method and device for leakage detection and leakage location in an area of a supply network (e.g. water supply network, gas supply network or district heating network), wherein measurement values from sensors of the supply network are statistically analyzed for the presence of leakages by means of robust regression methods. In particular, the false alarm rate (type 2 error) is minimized in this case.

LIST OF REFERENCE CHARACTERS

B1, B2 Example
DMA Area
RK Regression curve
VB1, VB2 Region of confidence
S1-S5 Method step

What is claimed is:

1. A method for leakage detection and leakage location in an area of a fluid supply network including a network of fluid flow lines and a plurality of flow sensors arranged at different points in the network of fluid flow lines, the method comprising:
dividing the supply network into a plurality of network subsections, wherein at least some network subsections share at least one fluid flow line and at least one flow sensor with at least one other network subsection, such that the network subsections overlap each other geographically, the at least some network subsections including a first network subsection and a second network subsection that share at least one fluid flow line and at least one flow sensor with each other and have a comparable consumption profile, wherein the entire water consumption is measurable for each network subsection;
determining a regression curve of the inflow for the first and second network subsections that are comparable by:
for each of a plurality of measurement times during a period of normal operation and assumed leak-free operation of the supply network, plotting a data point in a multi-axis coordinate system including a first axis representing a measure of flow in a first network subsection and a second axis representing a measure of flow in a second network subsection, each data point indicating an inflow for the first network subsection along the first axis and an inflow for the second network subsection along the second axis, and
calculating a regression curve based on the plurality of data points using robust regression methods,
receiving, via a user interface, user input defining both:

a first region of confidence relative to the regression curve and defining a first allowable range of difference between the measured flow in the first network subsection and the regression curve, and a second region of confidence relative to the regression curve and defining a second allowable range of difference between the measured flow in the second network subsection and the regression curve, wherein each of the user-defined first region of confidence and second region of confidence is selected based on respective infrastructure details associated with each of the first network subsection and the second network subsection, and wherein measurement values that fall within both the first region of confidence and the second region of confidence indicate zero leakage;

during a normal operation of the supply network, using one or more flow sensors to measure a respective inflow for each network subsection within a defined measurement period without disrupting the normal operation of the respective network subsection;

generating time series of measurement values of the inflow for the first and second network subsections over a number of measurement periods; and comparing the time series of the measurement values of the inflow with the regression curve, including:

entering the time series of the measurement values into the multi-axis coordinate system including first and second axes representing the measure of flow in the first and second network subsections;

determining whether each measurement value falls within both the user-defined first region of confidence and the user-defined second region of confidence, determining that a particular measurement value falls outside the user-defined first region of confidence or the user-defined second region of confidence, and identifying a leakage in response to such determination, and identify a location of the leakage based on the location of the particular measurement value relative to the regression curve in the multi-axis coordinate system, such that the leakage and the location of the leakage are identified automatically, without human intervention at the identified location of the leakage, and without disrupting the normal operation of the fluid supply network, in response to identifying the leakage, automatically communicating a leakage alarm to a control unit for the supply network, and in response to the leakage alarm, automatically controlling at least one valve to seal off at least one fluid flow line or reroute a fluid flow in the network of fluid flow lines.

2. The method of claim 1, wherein the quality of the regression curve is defined by a robust correlation coefficient.

3. The method of claim 1, wherein the network subsections comprise virtual district meter network subsections.

4. The method of claim 1, wherein measuring a respective inflow for each network subsection within a defined measurement period comprises calculating sliding mean values or an integrated flow value of inflow for the defined measurement period.

5. The method of claim 1, wherein the measurement period comprises a period from 02:00 to 04:00 hours, a period from 00:00 to 24:00 hours, or a period from 06:00 to 18:00 hours.

6. The method of claim 1, comprising triggering an alarm in response to detecting a measurement value outside the region of confidence.

7. The method of claim 1, wherein the method is used in an infrastructure network for the transportation of a fluid.

8. The method of claim 7, wherein the infrastructure network is a water supply network or a gas supply network or a district heating network.

9. A device for leakage detection and leakage location in a network subsection of a fluid supply network including a network of fluid flow lines and a plurality of flow sensors arranged at different points in the network of fluid flow lines, in which the supply network is divided into a plurality of network subsections, wherein at least some network subsections share at least one fluid flow line and at least one flow sensor with at least one other network subsection, such that the network subsections overlap each other geographically, the at least some network subsections including a first network subsection and a second network subsection that share at least one fluid flow line and at least one flow sensor with each other and have comparable consumption profiles, wherein the entire water consumption is measurable for each network subsection, said device comprising:

instructions stored in non-transitory computer-readable media and executable to:

determine a regression curve of the inflow for the first and second network subsections having comparable consumption profiles by:

for each of a plurality of measurement times during a period of normal operation and assumed leak-free operation of the supply network, plotting a data point indicating an inflow for the first network subsection along a first axis and an inflow for the second network subsection along a second axis, and calculating a regression curve based on the plurality of data points using robust regression methods; and determine a region of confidence around the regression curve, wherein measurement values within the region of confidence indicate zero leakage;

sensors configured to measure a respective inflow for each network subsection within a defined measurement period during a normal operation of the supply network and without disrupting the normal operation of the supply network;

a user interface that receives user input defining an alarm threshold value; and instructions stored in non-transitory computer-readable media and executable, during a normal operation of the fluid supply network, to:

generate time series of measurement values of the inflow for selected network subsections over a number of measurement periods;

compare the time series of the measurement values of the inflow with a reference regression curve, including:

determining a distance between each measurement value and the regression curve, compare each respective determined distance to the user-selected alarm threshold value, determining that the distance between a particular measurement value and the regression curve exceeds the user-selected alarm threshold value, and determining the presence of a leakage in the supply network in response to such determination, and identifying a location of the leakage based on the location of the particular measurement value relative to the regression curve in the multi-axis coordinate system, such that the device is configured to identify the leakage and the location of the leakage automatically, without human intervention at the identified location of the leakage, and without disrupting the normal operation of the fluid supply network, in response to identifying the leakage, automatically communicating a leakage alarm to a control unit for the supply network, and in response to the leakage alarm, automatically controlling at least one valve to seal off at least one fluid flow line or reroute a fluid flow in the network of fluid flow lines.

10. The device of claim 9, wherein the quality of the regression curve is defined by a robust correlation coefficient.

11. The device of claim 9, wherein the network subsections comprise virtual district meter network subsections.

12. The device of claim 9, wherein the instructions are further executable to calculate sliding mean values or an integrated flow value for the measured inflow for each network subsection within the respective defined measurement period.

13. The device of claim 9, wherein the measurement period comprises a period from 02:00 to 04:00 hours, a period from 00:00 to 24:00 hours, or a period from 06:00 to 18:00 hours.

14. The device of claim 9, instructions stored in non-transitory computer-readable media and executable to trigger an alarm in response to detecting a measurement value outside the region of confidence.

15. A method for leakage detection and leakage location in an area of a fluid supply network including a network of fluid flow lines and a plurality of flow sensors arranged at different points in the network of fluid flow lines, the method comprising:

dividing the supply network into a plurality of network subsections, wherein at least some network subsections share at least one fluid flow line and at least one flow sensor with at least one other network subsection, such that the network subsections overlap each other geographically, the at least some network subsections including a first network subsection and a second network subsection that share at least one fluid flow line and at least one flow sensor with each other and have a comparable consumption profile, wherein the entire water consumption is measurable for each network subsection;

determining a regression curve of the inflow for the first and second network subsections that are comparable by:

for each of a plurality of measurement times during a period of normal operation and assumed leak-free operation of the supply network, plotting a data point in a multi-axis coordinate system including a first axis representing a measure of flow in a first network subsection and a second axis representing a measure of flow in a second network subsection, each data point indicating an inflow for the first network subsection along the first axis and an inflow for the second network subsection along the second axis, and calculating a regression curve based on the plurality of data points using robust regression methods, determining a region of confidence around the regression curve, wherein measurement values within the region of confidence indicate zero leakage;

receiving, via a user interface, user input defining an alarm threshold value;

during a normal operation of the supply network, using one or more flow sensors to measure a respective inflow for each network subsection within a defined measurement period without disrupting the normal operation of the respective network subsection;

determining sliding mean values or an integrated flow for each network subsection within the defined measurement period based on the measures inflow for each network subsection;

generating time series of measurement values of the sliding mean values or integrated flow for the first and second network subsections over a number of measurement periods; and comparing the time series of the measurement values of the sliding mean values or integrated flow with the regression curve, wherein measurement values lying outside the region of confidence indicate the presence of a leakage in the supply network, including:

entering the time series of the measurement values into the multi-axis coordinate system including first and second axes representing the measure of flow in the first and second network subsections, determining a distance between each measurement value and the regression curve, comparing each respective determined distance to the user-selected alarm threshold value, determining that the distance between a particular measurement value and the regression curve exceeds the user-selected alarm threshold value, and identifying a leakage in response to such determination, and identifying a location of the leakage based on the location of the particular measurement value relative to the regression curve in the multi-axis coordinate system, such that the leakage and the location of the leakage are identified automatically, without human intervention at the identified location of the leakage, and without disrupting the normal operation of the fluid supply network, in response to identifying the leakage, automatically communicating a leakage alarm to a control unit for the supply network, and in response to the leakage alarm, automatically controlling at least one valve to seal off at least one fluid flow line or reroute a fluid flow in the network of fluid flow lines.

16. The method of claim 1, wherein measuring a respective inflow for each network subsection within a defined measurement period comprises determining a minimum inflow during the defined measurement period.

17. The method of claim 1, wherein the user-defined first region of confidence defining the first allowable range of difference between the measured flow in the first network subsection and the regression curve is different than the user-defined second region of confidence defining the second allowable range of difference between the measured flow in the second network subsection and the regression curve, based on differences in infrastructure between the first network subsection and the second network subsection.

\* \* \* \* \*